United States Patent
Curtis et al.

(10) Patent No.: US 6,397,355 B1
(45) Date of Patent: May 28, 2002

(54) SYSTEM, METHOD, AND PROGRAM FOR AUTOMATIC ERROR DETECTION WHILE UTILIZING A SOFTWARE STATE MACHINE FOR CARRYING OUT THE PROCESS FLOW OF A SOFTWARE PROGRAM

(75) Inventors: Bryce Allen Curtis, Round Rock; Jimmy Ming-Der Hsu, Austin, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/280,375

(22) Filed: Mar. 29, 1999

(51) Int. Cl.[7] ............................. G06F 11/00; G06F 11/36

(52) U.S. Cl. ................................. 714/38; 714/48; 717/4

(58) Field of Search ............................... 714/38, 48, 37, 714/46, 822; 717/4, 5

(56) References Cited

U.S. PATENT DOCUMENTS 5,583,988 A * 12/1996 Crank et al.
5,687,375 A * 11/1997 Schwiegelshohn

OTHER PUBLICATIONS

Setup Factory 4.0, "User's Guide", Mar. 1998, Winnipeg Canada, IndigoRose software Design Corp., pp. 1–84.

EMedialive: EMedia New Products, EMedia Professional, Feb. 1998. http://www.emedialive.com/EM1998/products2.html.

* cited by examiner

Primary Examiner—Gopal C. Ray
(74) Attorney, Agent, or Firm—Marilyn Smith Dawkins

(57) ABSTRACT

A system, method, and program utilizes a software state machine for carrying out the processes and functions of a program. The components of a program, e.g., the process flow, functions, dialogs, etc., are implemented using various states. A value of a state variable indicates a corresponding state. A method checks for a current value of the state variable. Any given function within any given state, or input received from a user, such as through "next" or "previous" buttons on a dialog box, can return a value for the state variable. When the method determines a new value of the state variable, an object corresponding to the state indicated by the new value is brought up and enabled. A program utilizing a software state machine is easily customized by merely adding or deleting states or by changing a value of the state variable returned for a given function within a state or for any given input received. However, if during development or customization of the program, the programmer inadvertently specifies a value of a state incorrectly, thereby having it reference a nonexistent state, the program my enter an infinite loop. Therefore, in a preferred embodiment, an error detector is added to the method that checks for the current value of the state variable in order to detect such a programming error. The programming error is detected by determining whether one of the states successively repeats beyond a given threshold limit.

14 Claims, 4 Drawing Sheets

```
vector statelist  ~ 1300
State Machine  ~ 113
    while state not equals ("exit")} }  ~ 1301
1302 ~ addState (state)  ~ 1303
    if state.equals ("Welcome") {  ~ 1304
        welcome d = new Welcome(...);  ~ 1305
        show (d);
        if d.getResult( ).equals("NEXT")}
            state = license  ~ 1308
        if d.getResult( ).equals("Cancel")}  ~ 1309
            state = "Cancel"  ~ 1310
        if d.getResult( ).equals("Back")}
            state = getPreviousState( );
    }
    then if state equals....
    •
    •
    •
}  ~ 1314
add state(string state) {
    statelist.add(state);  ~ 1315
}
String get PreviousState( ) }  ~ 1316
    s = statelist.getlast element( );  ~ 1317
    set size to length - 1  ~ 1318
    return s  ~ 1319
}
``` vector statelist ~ 1300

State Machine — 113
while state not equals ("exit")) } — 1301
1302 ~ addState (state) ~ 1303
if state.equals ("Welcome") { ~ 1304
    welcome d = new Welcome(...); — 1305
    show (d);
    if d.getResult( ).equals("NEXT"))
        state = license ~ 1308
    if d.getResult( ).equals("Cancel")) — 1309
        state = "Cancel" ~ 1310
    if d.getResult( ).equals("Back"))
        state = getPreviousState( );
} then if state equals....

•
•
•
}
    add state(string state) { — 1314
        statelist.add(state); — 1315
    }
String get PreviousState( ) } — 1316
    s = statelist.getlast element( ); — 1317
    set size to length - 1 ~ 1318
    return s ~ 1319
}

FIG. 3

```
}                          ⎯400
addState(state) {
        if (state = previous state) ⎯402
            count ++;  ⎯403
                       ⎯404
        if (count = TL )
            print ("Error") ⎯406
        exit, return ⎯408
        }
}
```

SYSTEM, METHOD, AND PROGRAM FOR AUTOMATIC ERROR DETECTION WHILE UTILIZING A SOFTWARE STATE MACHINE FOR CARRYING OUT THE PROCESS FLOW OF A SOFTWARE PROGRAM

CROSS-REFERENCE TO RELATED APPLICATIONS

The present application is related to the following applications:

application Ser. No. 09/280,345, entitled "A CROSS-PLATFORM PROGRAM, SYSTEM, AND METHOD HAVING A GLOBAL REGISTRY OBJECT FOR MAPPING REGISTRY EQUIVALENT FUNCTIONS IN AN AIX OPERATING SYSTEM ENVIRONMENT";

application Ser. No. 09/280,350, entitled "A CROSS-PLATFORM PROGRAM, SYSTEM, AND METHOD HAVING A GLOBAL REGISTRY OBJECT FOR MAPPING REGISTRY EQUIVALENT FUNCTIONS IN AN OS/2 OPERATING SYSTEM ENVIRONMENT";

application Ser. No. 09/280,349, entitled "A CROSS-PLATFORM PROGRAM, SYSTEM, AND METHOD HAVING A GLOBAL REGISTRY OBJECT FOR MAPPING REGISTRY FUNCTIONS IN A WINDOWS OPERATING SYSTEM ENVIRONMENT";

application Ser. No. 09/280,371, entitled "GLOBAL REGISTRY OBJECT FOR MAPPING REGISTRY FUNCTIONS AND REGISTRY EQUIVALENT FUNCTIONS ACROSS MULTIPLE OPERATING SYSTEMS IN A CROSS-PLATFORM PROGRAM";

application Ser. No. 09/280,368, entitled "A CROSS-PLATFORM PROGRAM, SYSTEM, AND METHOD HAVING A SYSTEM INDEPENDENT REGISTRY FOR USE ON OPERATING SYSTEMS IRRESPECTIVE OF A REGISTRY EQUIVALENT";

application Ser. No. 09/280,344, entitled "A SYSTEM, METHOD, AND PROGRAM FOR ENABLING A USE OF PROPERTY OBJECT HAVING A VARIABLE FOR A PROPERTY VALUE IN A CROSS-PLATFORM PROGRAM";

application Ser. No. 09/280,346, entitled "A SYSTEM, METHOD, AND PROGRAM FOR OVERRIDING PROGRAM PROPERTIES";

application Ser. No. 09/280,352, entitled "A SYSTEM, METHOD, AND PROGRAM FOR PROVIDING AN OBJECT-ORIENTED INSTALL ARCHITECTURE";

application Ser. No. 09/280,376, entitled "A SYSTEM, METHOD, AND PROGRAM FOR UTILIZING A SOFTWARE STATE MACHINE FOR CARRYING OUT THE PROCESS FLOW OF A SOFTWARE PROGRAM";

application Ser. No. 09/280,369, entitled "A SYSTEM, METHOD, AND PROGRAM FOR ENABLING A SOFTWARE PROGRAM TO AUTOMATICALLY SELECT A SYSTEM-DEPENDENT FUNCTION";

application Ser. No. 09/280,372, entitled "A SYSTEM, METHOD, AND PROGRAM FOR MAPPING A GLOBAL OBJECT TO DESKTOP ELEMENTS OF DIFFERENT OPERATING SYSTEMS";

application Ser. No. 09/280,370, entitled "A SYSTEM, METHOD, AND PROGRAM FOR PROCESSING DEPENDENCIES USING A DEPENDENCY OBJECT";

application Ser. No. 09/280,348, entitled "A SYSTEM, METHOD, AND PROGRAM FOR MODIFYING A TEXT FILE";

application Ser. No. 09/280,351, entitled "METHOD, SYSTEM, AND PROGRAM FOR UPDATING PRODUCT REGISTRY FILES WITH A CROSS-PLATFORM INSTALLATION PROGRAM";

application Ser. No. 09/280,374, entitled "A SYSTEM, METHOD, AND PROGRAM FOR PRESERVING BACKGROUND SETTINGS DURING INSTALL AND UNINSTALL OPERATIONS";

application Ser. No. 09/280,347, entitled "A SYSTEM, METHOD, AND PROGRAM FOR MODIFYING A LIBRARY OBJECT";

application Ser. No. 09/280,353, entitled "A SYSTEM, METHOD, AND PROGRAM FOR INSTALLATION ON DRIVES USING A DRIVE OBJECT"; and application Ser. No. 09/280,373, entitled "A SYSTEM, METHOD, AND PROGRAM FOR PERFORMING PROGRAM SPECIFIC OPERATIONS DURING THE UNINSTALLATION OF A COMPUTER PROGRAM FROM A COMPUTER SYSTEM."

The above are all filed on the same day as the present application, assigned to the assignee of the present application, and incorporated by reference herein.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to the flow of control of software programs, and more specifically to utilizing a software state machine to control the process flow of a program, and for detecting programming errors resulting from a programmer incorrectly specifying a state.

2. Background and Related Art

An installer program is a software program that enables a programmer to write specific code that will allow a user to install a given application program onto the drives of a computer in a way that enables the given application program to work correctly with the computer's environment including its operating system. There are several types of installers—Java installers and operating system specific installers, e.g., Windows installers, OS/2 installers and AIX installers, etc. Many of these install programs existing today have various limitations in their functionality as discussed below.

One type of Java installer is provided by a software company known as InstallShield. Currently, this Java installer has some limitations on certain functional features. For example, the Java installer provides default panels, but the text can't be changed or configured. Also, this Java installer is not easy to customize. In other words, a programmer cannot easily add a function to the installer program that it doesn't already do. In addition, the Java installer does not provide very much registry support. A registry is a central repository for all possible information for the computer such as hardware configurations and software settings, etc. The registry enables a user/programmer to keep information about the software product. It enables a user to find out information about other products, based upon what the user/programmer put into the registry or what the user is looking for. Presently, the Java installer only works with a Windows' registry; and the support provided here is limited. For example, it does not enable the system Windows' registry to be updated directly. Instead, the keys to be updated are in a file which must be imported into the registry through a system call. It would be desirable if such a Java installer program supported multiple directories, splash screens (which are images that come up while a software product is being installed), and multiple languages instead of just English. Furthermore, it would be desirable for a given installer program to be more broadly applicable to other environments and operating systems. Although InstallShields' Java installer is tailored to Java, it is also geared somewhat for the Windows' operating system as discussed above in terms of the Windows' registry support provided. However, it does not provide specific support for other operating systems such as OS/2 or AIX.

Another Java installer is called "install Anywhere" from ZeroG. This Java installer program also has a default panel that cannot be changed, i.e., it is not customizable in terms of the order in which the panels are to appear. Likewise, registry support is limited. A user/programmer updates a registry from a file using a "reg_edit" command. Although this installer program enables a user/programmer to add a few items into the registry, the registry cannot be queried. In addition, other registry functional features are not available. Likewise, there is no multiple directory support, and no national language support. Also, it does not support multiple operating systems, i.e., there is no OS/2 or AIX specific support.

Another approach would be to provide install APIs for Java. However, this approach is not yet available.

With respect to operating system specific installers, InstallShield provides a Windows' 32 installer. Although this installer program is widely used throughout the industry, it is based upon a proprietary scripting language that InstallShield defined. The scripting language is similar to Basic programming language. Nevertheless, a user/programmer must learn the scripting language to be able to write an install program, and it is not a real easy language to write in. When creating install programs using the Windows' 32 installer, a programmer must first learn the new language. Even then, it is difficult to write complicated install scripts with this scripting language.

For the OS/2 operating system, there is not a true architected way within the operating system itself to install. Two programs have existed for writing install code on OS/2. One of them is "Feature Installer", which has a tendency to be difficult to use. Also, it is hard to figure out how to write an install program from it. For example, it is tied into the workplace shell which requires special knowledge of SOM programming. Also, there is no compression of files. The second program is "Software Installer", which was the precursor to "Feature Installer", and is no longer supported as a product.

Also, for the OS/2 operating system, since OS/2 has Java on it, a programmer could use InstallShields' Java edition to write install code to install some types of programs. However, this does not provide much function other than just copying files.

Other than using Feature Installer, Software Installer, or a Java Installer, programmers must come up with their own way to write install code for an application program on an OS/2 machine.

Since the OS/2 operating system appears to have been architected without regard to install features, the above discussed ways for installing OS/2 application programs have no way to talk to each other. They will each have a different way of keeping track of things. As such, there is no one place to go to find out what has been installed on an OS/2 machine or to check dependencies to see what has been installed already.

For the AIX operating system, the command "installp" is used to install products. It is platform specific. It is also command line driven which is typical for the AIX operating system. Nevertheless, it appears to work well and is widely used.

As shown above, installers are tailored for a specific operating environment, e.g., JAVA, and/or operating system. As such, programmers using an installer to write install code must know and understand the specific operating environment and/or system quite well. This creates an added burden for a software company that produces many different application programs, with each application program available on many different operating systems. Separate install code must be written for each application for each different operating system. This requires a matrix of expertise—expertise in a given application, and expertise in a given operating system environment. This requires either a widely knowledgeable expert who is burdened with writing various specific versions of install code, or many different expert programmers who are essentially assigned the same task of writing install code.

Without such expertise, small software products just do not get install programs written for them for various platforms. In addition, money, resources, and time could be saved by writing an installer program only once that is applicable across all operating systems and environments.

It would also be desirable for a software manufacturer to have a common look and feel for writing install code for all of its products. In this way, as a programmer moved from platform to platform in writing install code, the programmer would recognize the interface, and know how it works. Thereby making the programmers task much easier.

Also, as shown above, there presently does not exist a functionally rich installer for Java. It is desirable to have a Java installer that is at least as functionally rich as a Window's installer.

Also, previously known Java installers are hard coded in the steps or functions that the installer program goes through. That is, it is predetermined or set that the process will go from one step to a known next step. These installers do not allow a programmer or user to jump from one step or function to another random step or function, i.e., jumping across steps or functions to other steps and functions, and then being able to go back, at any point or place within the process flow of the program to a previous step or function such as in response to user input through a back arrow.

SUMMARY OF THE INVENTION

It is therefore an object of this invention to provide a cross-platform installer that can be used to install products across multiple operating systems.

It is a further object of this invention to provide a tool kit that will enable a programmer knowledgeable in writing install programs to be able to automatically write an install program that is applicable across other operating systems and environments without having to be an expert in each of the operating systems and environments.

It is a further object of this invention to provide a common look and feel for writing install code for all products.

It is a further object of this invention to provide a full function installer.

It is a further object of this invention to provide a programmer flexibility in creating an install program by enabling the programmer to make changes easily in program functions and in the flow of the program.

It is a further object of this invention to readily detect a programming error when a programmer creates an install program.

The installer tool kit of the preferred embodiment of this invention supports the Windows 32 operating systems including Windows 95, Windows 98 and NT 4.0. It also supports OS/2 Warp 4.0, OS390, AIX 4.1 and higher versions, Solaris and Linux 4.2. Although the structure of the preferred embodiment enables support for any given operating system or environment, future embodiments or further enhancements to the present preferred embodiment will enable full support for other operating systems such as NT 5.0, HP-UX, and AS/400.

In the preferred embodiment of this invention, the functions provided by the installer tool kit are script based (Java). This enables the developer writing an installer to do whatever the developer wants to do. The developer is not limited in having panels occur in a particular order, or in not being able to make the calls that need to be made, or in not being able to perform a desired function such as configuring files, etc. To accomplish this, the tool kit was written using Java, although any script-based language would provide this same flexibility. As such, anything that Java has available in it is available to the developer. Furthermore, the tool kit enables a developer to perform functions on files and directories, e.g., to copy, read, create, modify, version and to batch files. With respect to registry functions, the tool kit enables a developer to write an install program that can read, create, modify, delete, and enumerate registries for the Windows operating system which is the only operating system that has a registry. These same functions are provided for all other operating systems that do not have a registry, but do have registry equivalent functionality.

Other functions of the tool kit include i) providing install property objects that contain variables as values that become defined for a specific operating environment; ii) enabling a property value to be temporarily overridden; iii) a software state machine that enables a programmer to easily customize an install program by merely adding, deleting or changing the various states that contain the functions and flow of control of the program; iv) automatically detecting a programming error if a programmer incorrectly specifies a nonexistent state within the state machine, v) automatically selecting a system-dependent function; vi) a containment structure consisting of program object/fileset objects/install objects where each fileset object and install object contains means to install and uninstall itself and to log itself; vii) enabling the management of folders, shortcuts and icons, viii) enabling environment variables to be read, created, modified and deleted, ix) providing dependency checking of prerequisite programs during both install and uninstall, and x) providing various logs, e.g., a log for keeping track of what is being installed, and a log that reports the progress of install. Logs are used for both the install and uninstall process. Furthermore, these logs are human readable which allows them to be checked, e.g., after a silent install, to ensure that a file has installed successfully. The tool kit also enables multiple destination directories to be installed from multiple source directories. For example, there can be multiple components of file sets included in an install where a file set is a separately installable/uninstallable piece of code or set of files.

The tool kit also enables an install program to undo an install. What has been changed during an install is kept track of. If, for example, an install is over the top of a previous install, the changes are saved in a file and restored if the latest install is then uninstalled. In other words, a previous version is recovered when a latest version is uninstalled by replacing a backup of files.

Other features include a) a progress bar that shows the status during an install, b) splash screens which can be displayed during an install, c) national language support, d) the ability to perform unattended install from install scripts, and e) an install wizard. There are also twenty or so defining default panels that are available. It is also easy for a programmer to add a programmer's own panels without a lot of effort.

More specifically, the functions and flow of control of an install program are incorporated within various states of a software state machine. Any given function within the install program is performed within a specific state. A result returned from that function includes a value for the state variable which indicates whether the state is to be preserved, changed (i.e., to a next or previous state), or canceled. A vector in memory keeps track of the sequence of states being executed which enables the system to return to a previous state. The structure of the state machine enables the program to flow from one state to another in a non linear or random or non sequential manner. The structure of the state machine also enables a programmer to readily customize a program by merely adding, deleting, or changing a state.

Due to the possibility that a programming error may occur as a result of incorrectly specifying the value of a state, an error detector is added to a method that determines whether a state successively repeats beyond a threshold limit. Such a determination indicates whether the program entered an infinite loop due to the value of the state referencing a nonexistent state.

Preferred embodiments of the invention include a) an installer tool kit, including a system, method, and program, that enables the creation of install programs for any one of a plurality of operating systems as described herein, b) an install program that can be used for multiple platforms to install an application program on a specific operating system; i.e., the same install program can be used to install a similar application program on different operating systems, c) a method for carrying out the functions of the install program, and d) a computer system running the install program on a specific operating system for installing an application program. Other more general embodiments include a) any tool kit for enabling the creation of programs that are capable of running on more than one operating system, b) any program that is enabled for multiple platforms, c) methods carried out by cross platform programs, and d) a computer system running a program that is enabled for multiple platforms.

BRIEF DESCRIPTION OF THE DRAWING

FIG. 3 illustrates a software state machine implementation;

DETAILED DESCRIPTION

The following description and the accompanying drawings illustrate a preferred embodiment of the present invention. It is understood that other embodiments may be utilized, and structural and operational changes may be made, without departing from the scope and spirit of the present invention.

Figure 1:
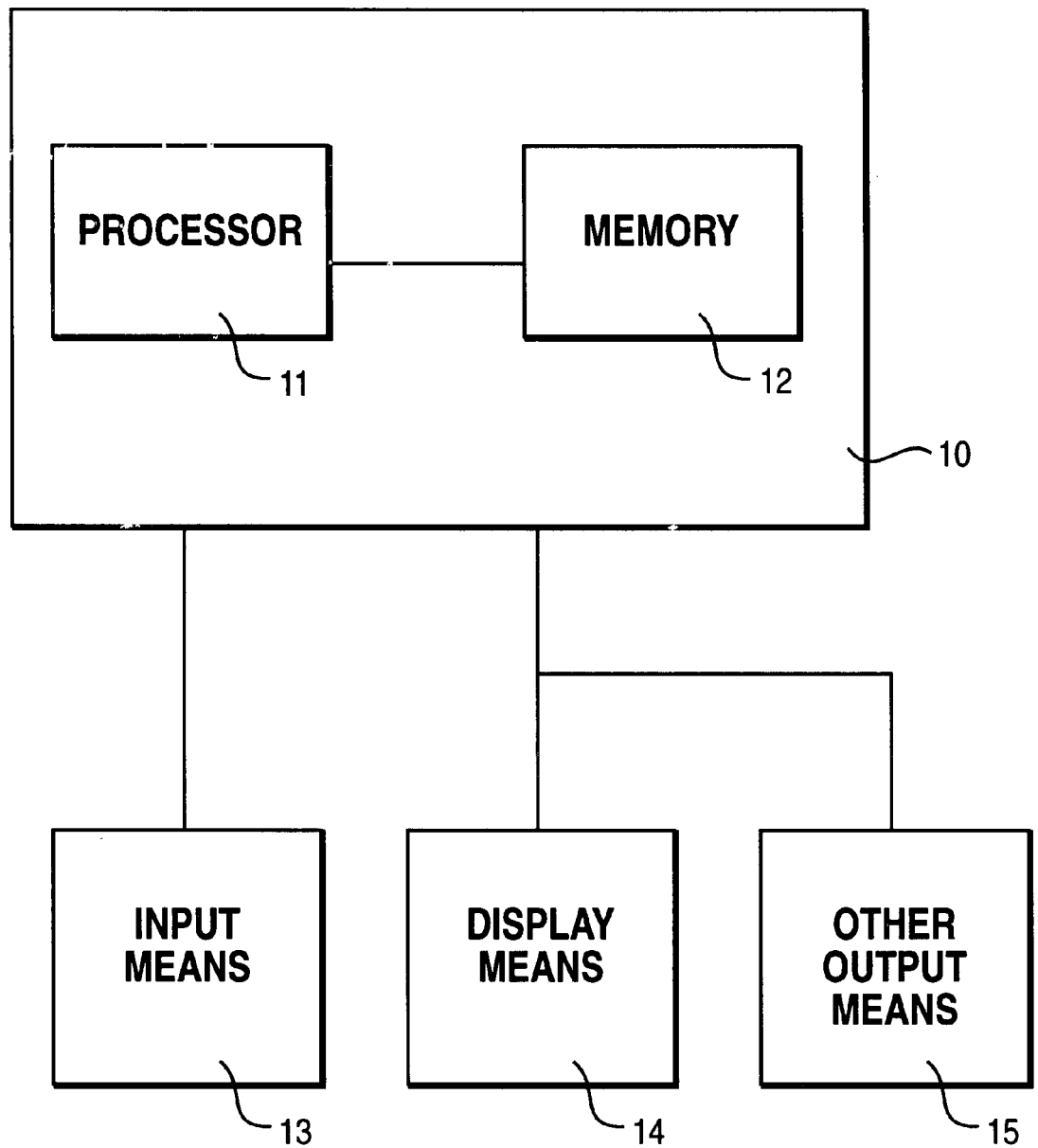
FIG. 1 depicts a block diagram of a data processing system in which a preferred embodiment of the present invention may be implemented.

With reference to FIG. 1, a block diagram of a data processing system 10, i.e., computer system, in which a preferred embodiment of the present invention may be implemented is depicted. The computer includes a processor 11 and memory 12. The computer 10 may be, but is not limited to, a personal computer, workstation, or a mainframe. The computer system also includes input means 13 such as a keyboard and/or mouse and/or track ball and/or light pen and/or pen-stylus and/or voice-sensitive device and/or touch-sensitive device, and/or other pointing devices and/or other input means. Also included are display means 14 such as a display monitor and other output means 15 such as printers, etc. Memory 12 includes volatile or nonvolatile storage and/or any combination thereof. Volatile memory may be any suitable volatile memory device known in the art, e.g., RAM, DRAM, SRAM, etc. Nonvolatile memory may include storage space, e.g., via the use of hard disk drives, for programs, whether or not the programs are being executed. The programs in memory 12 include an operating system program and application programs, such as an install program or an installer tool kit. If the memory 12 is comprised of volatile and nonvolatile memory devices, then data and programs may be swapped between the volatile and nonvolatile devices in a manner known in the art.

The exemplary embodiment shown in FIG. 1 is provided solely for the purposes of explaining the invention and those skilled in the art will recognize that numerous variations are possible, both in form and function. For instance, any one or more of the following—the processor and/or memory and/or the input/output devices— could be resident on separate systems such as in a network environment. Any such variation to FIG. 1 is within the sprit and scope of the present invention. The computer system and parts thereof depicted in the figures and described below, and the Java implementations described herein, are provided solely as examples for the purposes of explanation are not intended to necessarily imply architectural limitations. Those skilled in the art will recognize the numerous programming languages which may be utilized, all of which are believed to be embraced within the spirit and scope of the invention.

Figure 2:
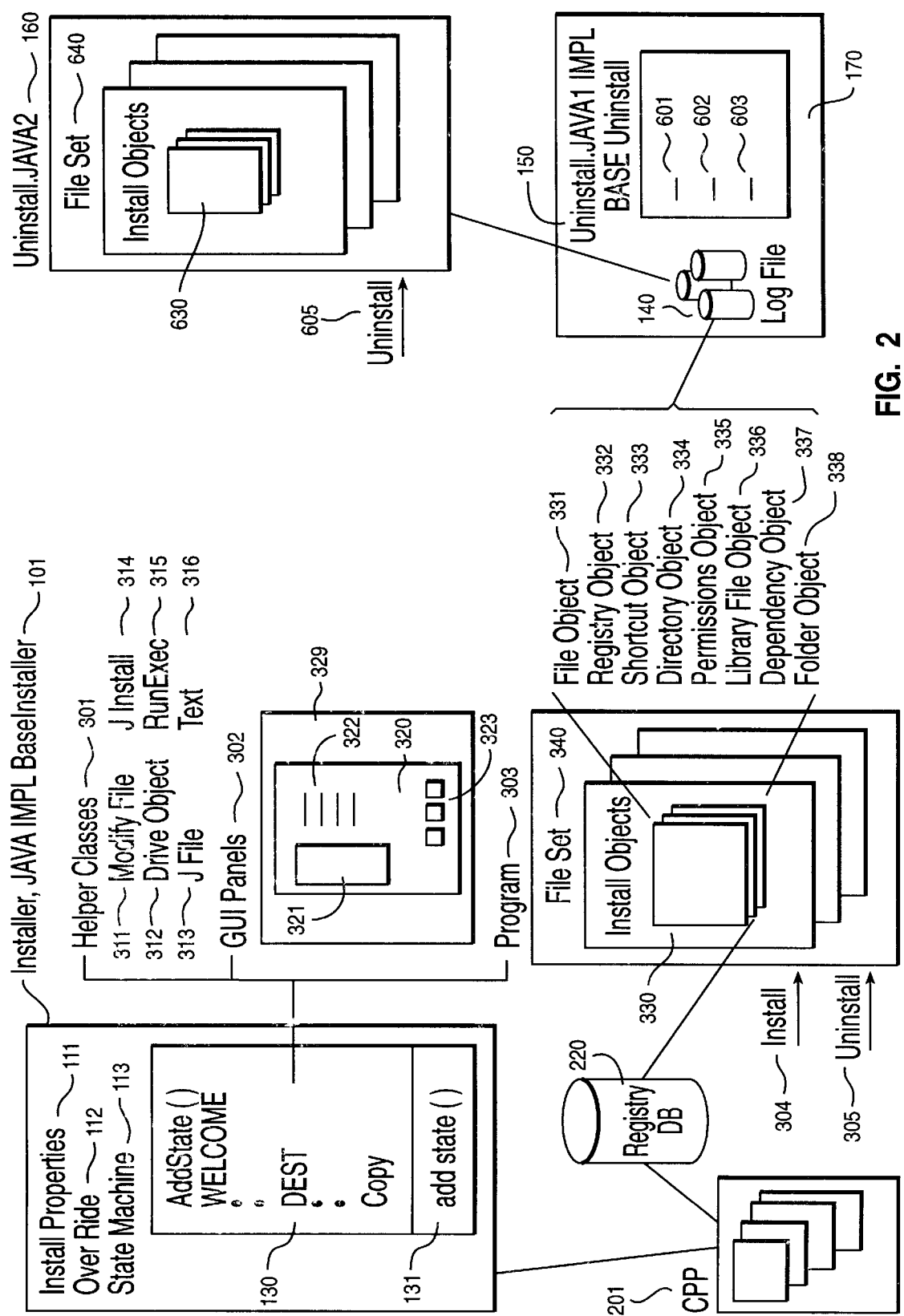
FIG. 2 depicts the flow and structural components of a cross-platform installer program.

The system, method and program of a preferred embodiment of this invention enables the creation of a cross-platform installer program in accordance with the structural components and flow of FIG. 2.

A script, referred to herein as "installer.java", 101 FIG. 2, is used to run the install engine. The script implements the base installer class in Java. Within the script 101 there are the following entities: a) install properties 111; b) an override function 112; c) and a state machine 113. Within the state machine 113, there are various states 130 such as a welcome state, a destination state, a copy state, etc. This state machine includes an "add state method" 131 which is further used to check for errors. The following process takes place when the base installer class starts running; a) the properties are set up, 111, b) the properties are overridden, 112, and then c) the state machine 113 is executed. The program stays in the state machine until exited out. At exit, the program has either been successfully or unsuccessfully installed.

Within any given state 130 there are several objects. There are helper classes 301, GUI panels 302, and a program object 303.

Within the helper classes 301, there is a modify file class 311, a drive object class 312, a J file class 313, a J install class 314, a run exec class 315, and a text class 316. The modify file class 311 and drive object 312 will be discussed in more detail either below or in a related application. J file 313 is a class that enables actions to be performed with files and directories. J install 314 contains methods that enables access to environment variables and enables other similar activities. Run exec 315 is a class that enables the running of operating system calls. Text class 316 is a class that is used to handle national language support.

An example of a GUI panel 320 is shown in FIG. 2. There may be an image 321, text or controls 322 and buttons 323 such as back, next or cancel. The GUI panels 320 all extend a class calling a wizard dialog. They are displayed in a mainframe class 329. The mainframe class manages the screen display, e.g., gradient background color, gradient text. It also manages the splash screens and titles and other similar items including where they are being displayed. In other words, it manages the background image and screen image upon which the dialogs are displayed.

Within any given state there is also the heart of the install program, which is a program object 303 having file set objects 340. Within each file set object 340 there are multiple install objects 330. There are several types of install objects—file object 331, registry object 332, shortcut object 333, directory object 334, permissions object 335, a library file object 336, a dependency object 337, and folder object 338. Other objects are also possible. All of these objects extend or implement install objects 330. In addition, all of the install objects have certain methods on each of them. In particular, each install object knows how to install or uninstall itself, how to log itself, and how to internalize from a log, i.e., how to build itself back up again from reading from a log.

The install process that the script 101 enables includes running the state machine 113 through various states 130 which cause different events to take place. For example, a GUI panel may pop up as part of the welcome state. During a destination state, another GUI panel may pop up on the screen that asks where the product is to be installed. The install properties 111 may be used in the destination state by having a destination panel set a particular destination directory name of an install property to a particular directory. During the copy state the program object 303 is built up with all of the install objects 330 in them. The install command 304 is then called on the program object. Each one of the file sets 340 and install objects 330 contains an install method. As such, by calling install 304 on the parent object, i.e., the program object 303, the program object goes through and calls install on all of the other objects 340, 330 that it contains.

Likewise, the uninstall process is also enabled by the script 160. For uninstall, there is an uninstall method on the file set 340 and on all of the other install objects 330. By calling uninstall 305 on the program 303, everything becomes uninstalled, i.e., the program, file sets and install objects.

It should be noted that during an install, each one of the install objects 330 gets written out to a log file 140 which is put into a particular directory. At the same time that the install objects 330 log themselves to the log file, there is also another file, called "uninstall.Java1" 150 which implements a "base uninstall" class. It has several methods in it that get called at different points during uninstall. During install, the log 140 and "uninstall.Java1" 150 information are built. The log file 140 and "uninstall.Java1" 150 are in the file system 170 on a particular directory. If it is uninstalled, the first thing that happens is that it reads into "uninstall.Java2" 160 the log files 140 and recreates the same structure 160 as the file sets 340 and install objects 330. It does not recreate the program object 303, but rather it recreates the structure of everything contained within the program object, i.e., file sets 640 and install objects 630. As a result, recreated from the log file 140 is a file set with all of the install objects that it contains. There is one log file for each file set. Directory 170 can be thought of as a container just like the program directory 303 is a container for the file set 340 and install objects 330.

"Uninstall.java2" 160 builds up the file sets 640. Uninstall 605 is called by the uninstaller, and it goes through each file set and install object and uninstalls itself. During the uninstall of each file set 640, the base uninstaller class 150 is called at the beginning and at the end of the file set. Therefore, at the beginning and ending of copying a file set 640, the installer makes a call to the base uninstaller class 150 at appropriate points 601, 602, 603, as discussed below. This allows certain things to happen when the file set is being uninstalled.

There are certain platform specific operations that are taking place throughout the different objects, i.e., the helper classes 301, install objects 330, etc. Therefore, there is a platform specific module/interface. It is referred to herein as CPP 201. It defines a set of methods, that are representative of different operating systems, for functions that need to take place for an install. There are several different CPPs 211, 212, 213, . . . 219, etc., one for each operating system. For example, CPP Win 32, CPP OS/2, CPP Solaris, CPP Linux, and CPP AIX. There is also a CPP default. If the operating system is not implemented through a CPP, the CPP default is used. This CPP 201 is the platform specific code for the installer.

Since most platforms, i.e., operating systems, do not have a registry, a platform independent registry database class 220 is created which ties the platform specific code 201 with registry objects 332. The registry database 220 implements the registry function for those platforms which do not have a registry.

The above description presented an overview of the install program and how it works. The following describes, in more detail, various parts of the overall structure and process described above. More specifically, the software state machine 113 that is used in the install process is further described with reference to FIG. 3.

Within the state machine, while a state variable does not equal exit 1301, the state machine will go from state to state based upon what the state variable is set to. During the install process 101 there is an "addState( )" method 1302 within the state machine 113. "State" 1303 is a variable that is used within the "addState( )" method 1302. A state variable can be an integer, a string or anything else. The type of variable used is not important. However, strings are used in a preferred embodiment because strings are easier to program in terms of reading and using them.

The "addstate( )" method checks as to what value the variable state is equal to, e.g., a welcome state, 1304, If the value of the variable "state" is "welcome", then a new welcome object is brought up and enabled 1305. The welcome object can then get results. Various functions within a given state may return results leading to a next state, going back to a previous state, or canceling the given state. It should be noted that results are not limited to these results—next, back, previous, cancel, etc.—as shown in FIG. 2. The results returned can be anything. However, for illustrative purposes, the results "next", "cancel", "back" may be returned from input from a user from buttons 323 displayed in a GUI panel 302 during a given state. For example, the next state after the "welcome" state within a software product, such as an installer program product, may be a "license" state 1308 that would use panels 302 (FIG. 1) to display to a user the terms of the program license. Regardless of the actual state that the program product was in, if the next state was pressed, then the state machine would proceed to the next state. If d.getresult=cancel 1309, then the program would proceed to the cancel state 1310. If d.getresult=back, then the state machine goes back to the previous state. The vector statelist maintains a history of the states by keeping track of the sequence of states being executed. This enables a return to a previous state. The above has described how a software program utilizing a state machine for carrying out its various processes and functions is enabled to move from state to state.

In Java, there is an object called a vector object which keeps track of items and objects. As part of the vector object, a state list 1300 is created specifically for a preferred embodiment of this invention. As described above, within the state machine 113 there is an "addState" method 1302 and a "get PreviousState" method 1316. The "add state" method adds states to the statelist vector 1315. The "get PreviousState" method 1316 returns a string which is the last item off of the vector statelist. The program logic that does this gets the last element from the state list 1317, sets the size shorter (set size to length—1) 1318, and then returns the variable S 1319.

The preferred embodiment of this invention allows a program, e.g., an installer program or an install program, to go from any one state to another state in a nonlinear fashion, randomly, or in other words, independent of any sequential order; while at the same time being enabled to go back to the previous state the program was at without having the logic built into a state of how the program got to that particular state. To accomplish this, the sequence of states used by a program is saved in a history file, i.e., a statelist vector within a vector object.

A software state machine, as described herein, provides flexibility to a programmer using an installer tool kit of a preferred embodiment of this invention to make changes to or edit an installer program that is being created using the tool kit. If, for a particular installer program a programmer needs to add a state (i.e., function, process flow, etc.), the programmer can easily add the state and keep track of it. A program utilizing a software state machine enables the program itself to be easily customized. Since a preferred embodiment of the state machine was written using Java code, at any state within the state machine a programmer can have the state do any type of Java function, e.g., panels, copying, installing, etc.

Figures 4, 5:
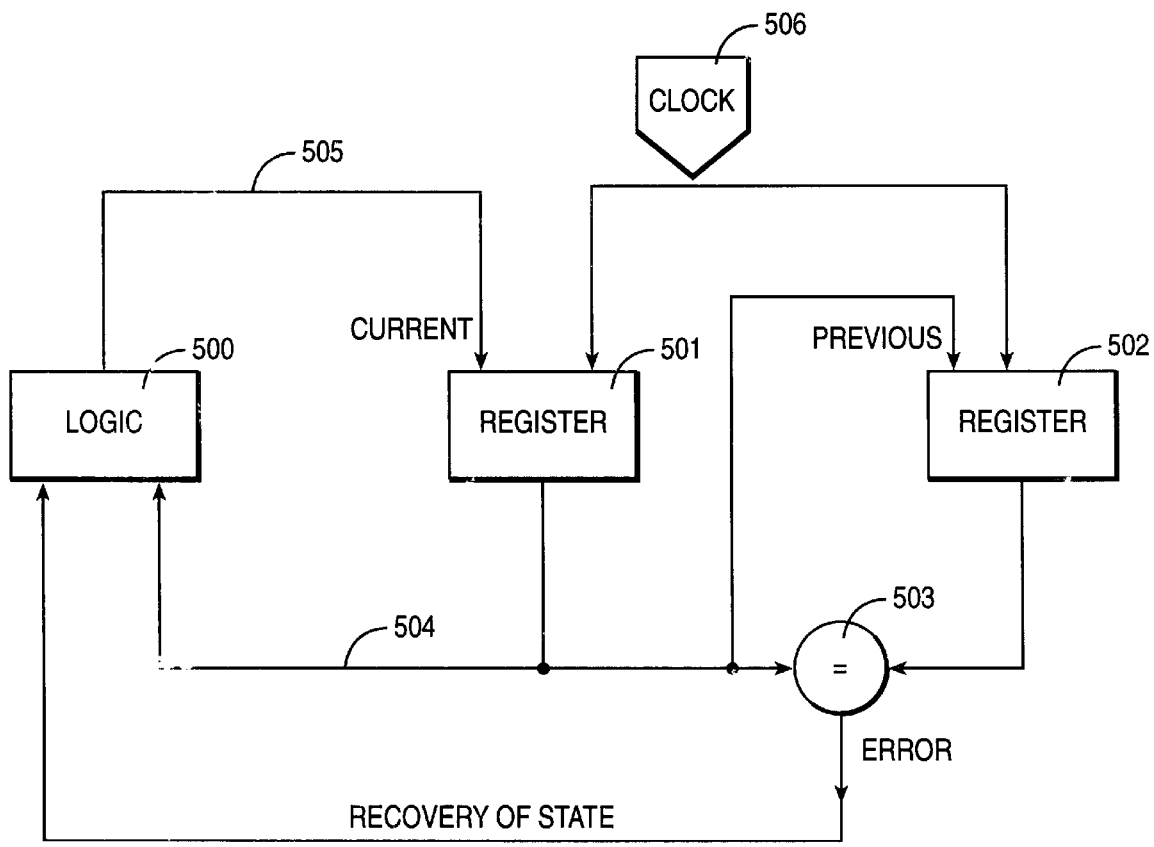
FIG. 4 illustrates a software error detector.
FIG. 5 illustrates a hardware error detector.

In another preferred embodiment of the invention, an automatic error detection function 400, FIG. 4 is added to the "addState" method within the state machine. The automatic error detection feature of this invention detects if an error has been made in specifying a nonexistent state which would then cause the process flow of the program to enter into an infinite loop. For example, as described above, a type of state variable may be a string, integer, etc. When setting a state using a string or numbers, there is always the possibility that the state will contain a typographical error. This can happen when comparing whether a state equals a state value, or when, based on results, a state is being changed to another state. If the state is mis-typed, such a mis-typed state is actually nonexistent. Before attempting to go to the mis-typed state, the current state is saved in a history vector and the program will idle in an infinite loop forever waiting to go to the next state. As such, mis-typing a state creates a programming error. It should be noted that the history vector can be of any size, as long as at least the current and previous state are kept.

Therefore, in a preferred embodiment of this invention, an error detector is added to the "addState" method. Whenever the "addState" method is used, the error detector determines what the previous state was. If it is determined that the previous state is the same as the current state 402, then this indicates that there might be a problem. Within the "addState" method, a count 403 is kept of how many times the process flow of the program is at a particular state. If state=previous state 402, then the count is incremented 403. If a program process is at the same state twice in a row, a programming error has probably been made. There may be instances though where the actual program process flow does indeed repeat a state. To handle these type of situations, an error is detected only if the count is determined to be equal to some predetermined or given number that has been set as the limit, i.e., a threshold limit, TL, 404. For example, there may be particular cases in getting a destination panel, where a programmer or user has typed in a directory that is not valid. The installer program is correct in going back to that directory panel again to allow the programmer/user to enter a valid directory. A given number can be used that indicates the count or number of times the same state repeats itself to indicate that a real programming error has been made. For example, if the number is 5, then the error check within the "addState" method will determine that a programming mistake has been made if the same state repeats itself five times. If the count equals the predetermined number, e.g., 5, then the error detector would print a message indicating an error, 406. The program would end or return, 408. The error detector saves a programmer a lot of time when scripts are being developed.

The error detector of the preferred embodiment of this invention is applicable not only to writing install programs but for creating or running any software program that utilizes a state machine implemented in software or even in hardware. That is, the error detector is applicable whenever the system should not be in a state for more than a certain number of times, whether its one, two, or five times or whatever other applicable number of times.

With reference to FIG. 5, if a hardware state machine 500 is used, a first register 501 keeps track of the current state and another register 502 keeps track of the previous state. Using a comparator 503, if the two registers 501, 502 are equal, then there is an error if a state should never repeat itself. The comparator 503 contains the logic for comparing the number of bytes. Depending upon the size of the state machine 500, the comparator will vary in size. Other hardware embodiments could use various combinations of flip flops and registers to result in various other hardware configurations.

With reference to FIG. 5, the output 504 from register 501 flows into some kind of combinatorial logic, and then the input 505 feeds back into register 501. A clock 506 dictates the rate at which the state machine runs. At a first clock cycle a state flows into logic 500 where a new state is generated. At the next clock cycle, the current state from logic 500 is fed into current register 501 as the previous state flows from register 501 into register 502. The comparator 503 compares the current state with the previous state. If they are equal, this would be a count of one. If a state were allowed to repeat itself once, such that the same state occurred two times before an error would be detected, this would be a count of two. A count of two could be implemented by having two shift registers for register 502. Other count values would have the applicable number of shift registers. One implementation would then send the error back to logic 500 for a recovery of state. Other implementations might handle the error result in different ways.

The program code flow for a software state machine for an install program including automatic error detection is as follows:

```
---- from Installer.java
/**
 * List of all screens that have been displayed by the install program
 */
Vector stateList = new Vector();
public void install() {
    // Set the starting screen to "Welcome" unless we are playing a
    // script. If playing, then we want to go directly to the copy state.
    String state = "Welcome";
    if(scriptPlay) {
        state = "BuildFileSet";
    }
    // This is the main loop of the state machine. We run in this
    // loop until state = "Exit"
    while (!state.equals("Exit")) {
        // Add state to history
        addState(state);
        // Welcome screen
        if (state.equals("Welcome")) {
            Welcome d = new Welcome(frame, false);
            show(d);
            if (d.getResult().equals("NEXT")) state = "License";
            if (d.getResult().equals("CANCEL")) state = "Cancel";
        }
        // License screen
        else if (state.equals("License")) {
            License d = new License(frame, false);
            show(d);
            if (d.getResult().equals("BACK")) state = getPreviousState();
            if (d.getResult().equals("NEXT")) state = "Destination";
            if (d.getResult().equals("CANCEL")) state = "Cancel";
        }
        ...
    }
}
/**
 * Pops the last element off the vector, then returns the
 * new last element as the new state to go to.
 * It uses the global variable "stateList".
 *
 * @return the new state to go to.
 */
public String getPreviousState() {
    int size = stateList.size();
    // remove last element (which is the current state)
    stateList.removeElementAt(size-1);
    // new state is new last element
    String s = (String)stateList.lastElement();
    // remove new state since it will be added when it
    // is visited
    stateList.removeElementAt(size-2);
    // return new state
    return s;
}
String prevState = "";
int prevCount = 0;
/**
 * Adds new state to state list. It checks to see if you
 * have stayed in the same state for 5 times. If so, then
 * an error is displayed, and the program is terminated.
```

-continued

```
* If this happens, it is a result of being stuck in a state
* by a programming error.
* It uses the global variable "stateList".
*
    * @param state the state to add.
    */
    public void addState(String state) {
        stateList.addElement(state);
        // If the state remains the same for some number of
        // calls, then there is probably a programming error
        if (state.equals(prevState)) {
            prevCount++;
            if (prevCount > 5) {
                System.out.println(TEXT.get("Installer.sameState") +
                "'" + state + "'.");
                System.exit(8);
            }
        }
        else {
            prevCount = 0;
        }
        prevState = state;
    }
vector statelist
    State Machine
        while state not equals ("exit")) }
        addState (state)
        if state.equals ("Welcome"){
            welcome d = new Welcome(...);
            show (d);
            if d.getResult().equals("NEXT"))
                state = license
            if d.getResult().equals("Cancel"))
                state = "Cancel"
            if d.getResult().equals("Back"))
                state = getPreviousState();
}
    then if state equals....
    .
    .
    .
}
    add state(string state) {
        statelist.add(state);
    }
String get PrevIousState() }
    s = statelist.getlast element();
    set size to length - 1
    return s
}
addState(state){
    if (state = previous state)
        count ++;
    if (count = _____)
        print ("Error")
        exit, return
    }
}
```

COPYRIGHT OF THE IBM CORPORATION, 1998

The present invention has been describe above in the context of a fully functional system, method, and computer program; all of which are capable of being contained within one or more physical devices. The program of this invention is capable of being made, used, sold and distributed in the form of a computer usable medium of instructions in a variety of forms. The present invention applies equally regardless of the particular type of signal bearing media actually used. Examples of computer usable media include volatile memory (e.g., RAM, DRAM, SRAM); nonvolatile memory such as read only memories (ROMs) or erasable, electrically programmable, read only memories (EPROMs), or recordable type media such as floppy disks, hard disks and CD-ROMs; and transmission type media such as digital and analog communication links.

While the invention has been particularly shown and described with reference to a preferred embodiment, it will be understood by those skilled in the art that various changes in form and detail may be made therein without departing from the spirit and scope of the invention.

We claim:

1. A tool kit program, on a computer usable medium, for enabling a development of a second program, the tool kit comprising:

means for enabling the second program to be represented through a plurality of states;

means for enabling a processing flow of the second program to be dependent upon a value of a state variable returned after performing a given function within a given state; and means for enabling a detection of a programming error because of a mis-entered value for the state variable.

2. The tool kit program of claim 1 wherein the tool kit program is an installer program that enables a development of an install program for installing an application program onto a computer system.

3. A tool kit program, on a computer usable medium, for enabling a development of a second program, the tool kit comprising:

means for enabling a plurality of processes and functions of the second program to be represented through a plurality of states;

means for enabling the plurality of processes and functions to be carried out by moving throughout the plurality of states; and means for enabling a detection of a programming error based upon a determination of whether one of the states successively repeats beyond a given threshold limit.

4. A program, on a computer usable medium, comprising:

a plurality of states, each state representing a segment of the program;

means for specifying a value of a state variable in a result returned from a given function performed within a given state;

means for directing a processing flow of the program based upon each value returned as each given function is performed: and means for detecting a programming error because of an incorrectly specified value for the state variable.

5. The program of claim 4 wherein the program is an install program for installing an application program onto a computer system.

6. A program, on a computer usable medium, comprising:

means for representing a plurality of processes and functions of the program using a plurality of states;

means for carrying out the plurality of processes and functions by moving throughout the plurality of states; and means for detecting a programming error based upon a determination of whether one of the states successively repeats beyond a given threshold limit.

7. A computer implemented method comprising:

developing a program to be executed on a computer system;

representing the program using a plurality of states;

depending a processing flow of the program upon a value of a state variable returned as a result of at least one of the following: performing a given function within a given state, and receiving input from a user; and enabling a detection of a programming error because of a mis-entered value for the state variable.

8. A computer implemented method comprising:

developing a program to be executed on a computer system;

representing a plurality of processes and functions of the program to be represented through a plurality of states;

enabling movement throughout the plurality of states, independently of any sequential order, to carry out the plurality of processes and functions; and enabling a detection of a programming error based upon a determination of whether one of the states successively repeats beyond a given threshold limit.

9. A computer implemented method comprising:

executing a plurality of states wherein each state represents a different segment of a program executing on a computer system;

specifying a value of a state variable in a result returned from at least one of the following: from a given function performed within a given state and from input from a user;

directing a processing flow of the program based upon each value returned; and detecting a programming error because of a mis-entered value for the state variable.

10. A computer implemented method comprising:

using a plurality of states representing a plurality of processes and functions of a program;

moving throughout the plurality of states, independently of any sequential state order, to carry out the plurality of processes and functions; and detecting a programming error based upon a determination of whether one of the states successively repeats beyond a given threshold limit.

11. A computer system, having a processor and a memory, comprising:

means for enabling a development of a program;

means for enabling the program to be represented through a plurality of states;

means for enabling a processing flow of the program to be dependent upon a value of a state variable returned after performing a given function within a given state; and means for enabling a detection of a programming error because of a mis-entered value for the state variable.

12. A computer system, having a processor and a memory, comprising:

means for enabling a development of a program;

means for enabling a plurality of processes and functions of the program to be represented through a plurality of states;

means for enabling the plurality of processes and functions to be carried out by moving throughout the plurality of states; and means for enabling a detection of a programming error based upon a determination of whether one of the states successively repeats beyond a given threshold limit.

13. A computer system, executing a computer program, comprising:

a plurality of states, each state representing a segment of the program;

means for specifying a value of a state variable in a result returned from a given function performed within a given state;

means for directing a processing flow of the program based upon each value returned as each given function is performed; and means for detecting a programming error because of an incorrectly specified value for the state variable.

14. A computer system, executing a computer program, comprising:

means for representing a plurality of processes and functions of the program using a plurality of states;

means for carrying out the plurality of processes and functions by moving throughout the plurality of states; and means for detecting a programming error based upon a determination of whether one of the states successively repeats beyond a given threshold limit.

* * * * *